March 6, 1962 B. J. MURPHY 3,024,028
CARTRIDGE TYPE SEAL

Filed Sept. 3, 1957 2 Sheets-Sheet 1

Inventor
Bernard J. Murphy
By James O. Alfson
Attorney

March 6, 1962  B. J. MURPHY  3,024,028
CARTRIDGE TYPE SEAL
Filed Sept. 3, 1957  2 Sheets-Sheet 2

Inventor
Bernard J. Murphy
by [signature]
Attorney 3,024,028
CARTRIDGE TYPE SEAL
Bernard J. Murphy, Springfield, Ill., assignor to Allis-Chalmers Manufacturing Company, Milwaukee, Wis.
Filed Sept. 3, 1957, Ser. No. 681,612
8 Claims. (Cl. 277—43)

This invention pertains to an axial contact sealing unit for installation between relatively rotatable members to prevent leakage of fluids and entry of dirt or foreign matter and is more particularly concerned with a cartridge type of sealing unit wherein the components thereof are retained as a package.

The principal applications and advantages of a cartridge type sealing unit are well known in the art. In certain applications, however, which require this type of sealing unit but have only a minimum axial space available, the conventional designs have not been entirely satisfactory for a number of reasons. For example, most cartridge type sealing units, which are rugged enough to effectively withstand the severe abuse required of, say, the seal installation in the bogie wheels of military track type vehicles, have a multiplicity of components and take up a considerable axial space. An additional objection is that most of these seal units are not only extremely difficult to assemble and disassemble but incorporate parts which are expensive to produce.

It is, therefore, the principal object of this invention to provide a cartridge type axial contact sealing unit which will overcome the difficulties hereinbefore outlined in an entirely satisfactory manner.

A more specific object of this invention is to provide a cartridge type axial contact sealing unit which has a minimum of components and takes up a minimum of axial space.

Another object of this invention is to provide a cartridge type axial contact sealing unit wherein a follower serves as a retaining member as well as an anchor for the pressure means and the sealing ring.

It is a further object of this invention to provide a cartridge type axial contact sealing unit wherein the follower serves as a retainer in addition to serving as a centering means for a follower ring which in turn centers the sealing ring, and wherein the axially resilient thrust transmitting elements are disposed in axial underlapping relation to the sealing ring. These and other objects and advantages of the invention will become apparent when the following description is read in conjunction with the annexed drawings in which.

Figure 1:
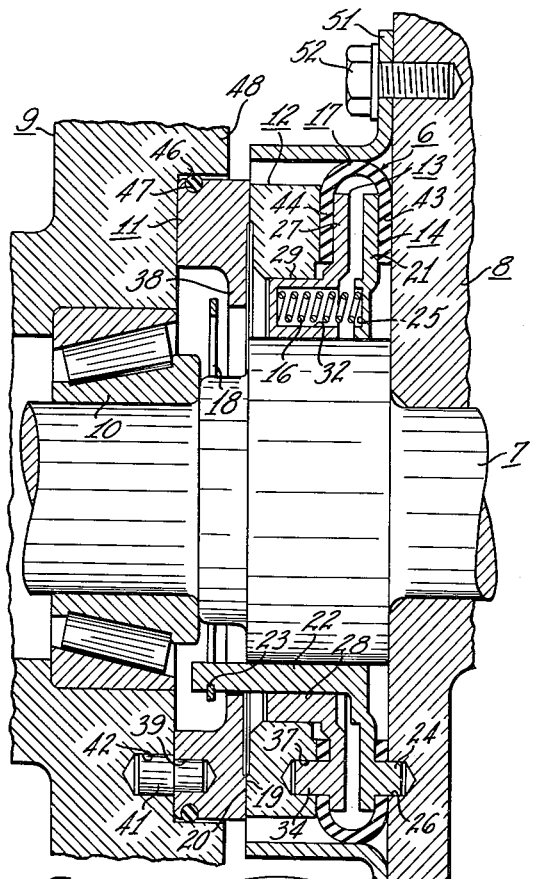
FIG. 1 is a fragmentary sectional view in side elevation showing the assembled sealing unit in the installed condition between a pair of relatively rotatable members.

Referring to FIG. 1, the axial contact cartridge sealing unit 6 is operatively installed between a stationary axle 7 which is mounted on a fixed bracket or support 8 and a wheel hub 9. Hub 9 is rotatably mounted on axle 7 by means of a conventional type tapered roller bearing 10. Since the mounting of a rotatable hub on an axle is well understood, a fragmentary view of this structure is believed to be sufficient for the purpose of illustrating the present invention.

Figure 2:
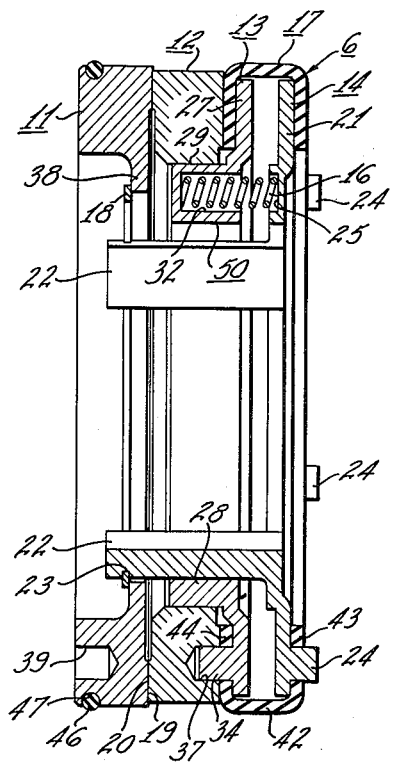
FIG. 2 is a sectional view in side elevation of the sealing unit in assembled condition.
Figure 3:
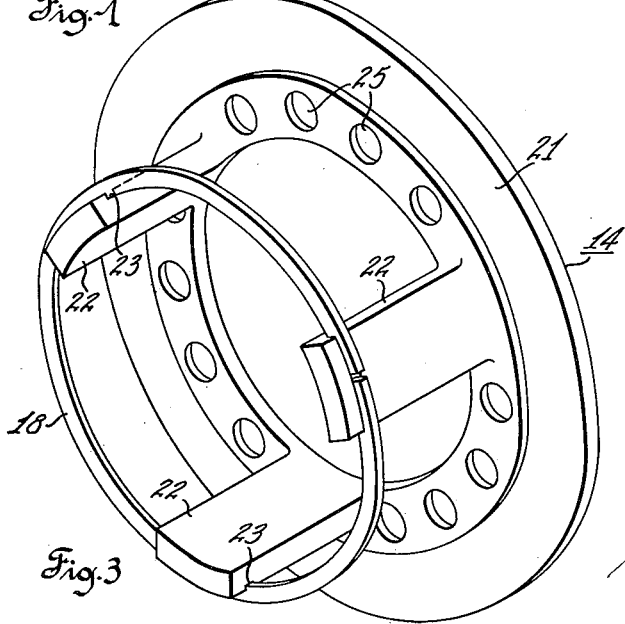
FIG. 3 is a perspective view of the following or retaining element.
Figure 4:
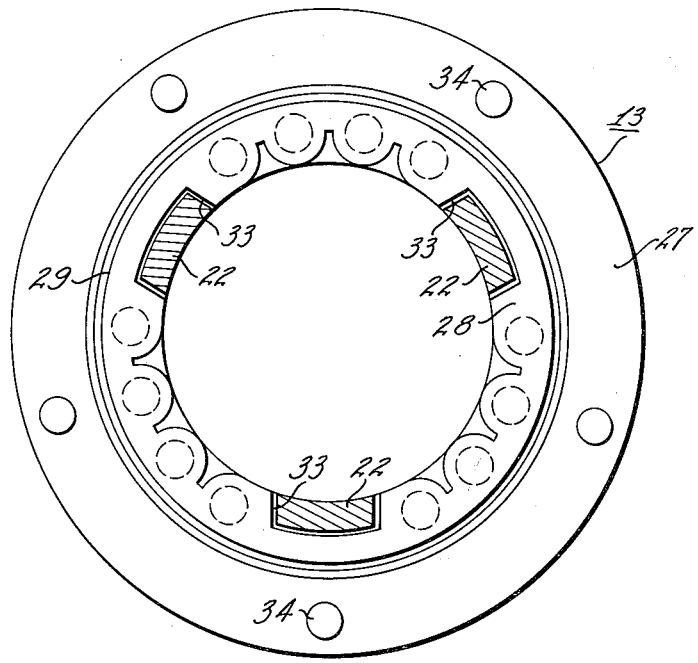
FIG. 4 is an end view of the follower ring assembled on the lugs of the follower taken along line IV—IV as shown in FIG. 5.
Figure 5:
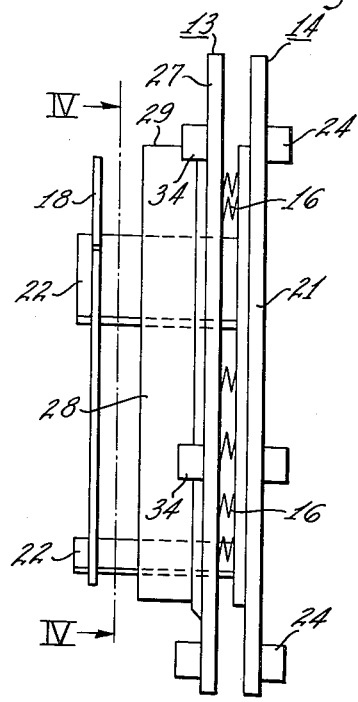
FIG. 5 is a side view of the follower assembled upon the lugs of the follower or retaining element.

Referring to FIGS. 2, 3 and 4, the principal components of the sealing unit include a pair of relatively rotatable sealing members, abutment ring 11 and sealing ring 12; a follower ring 13; a follower or retainer 14; a plurality of springs 16; a boot 17; and a snap ring 18. Abutment ring 11 and sealing ring 12 are of conventional design and respectively present sealing surfaces 19 and 20 which are precision lapped to insure a fluid tight contact.

The follower 14 actually serves as a retainer for the seal assembly and comprises a radially extending annular portion or plate 21 having three axially extending lugs 22 which are formed integral therewith. Lugs 22 present a slightly curved rectangular cross section and are spaced circumferentially about the inner periphery of and projected at right angles to annular plate 21. An annular groove 23 is provided in each of the lugs 22 for receiving a snap ring 18. On the side of annular plate 21 opposite to the side from which lugs 22 extend, a plurality of circumferentially spaced axially extending bosses 24 are projected. Bosses 24 are adaptable to be received in corresponding openings 26 provided in bracket 8. Bosses 24 thereby provide a means for non-rotatably securing the follower 14 to bracket 8. A plurality of circumferentially spaced openings 25 are provided in plate 21 for receiving one end of each of springs 16.

The follower ring 13 includes an annular flange portion 27 and an axially extending sleeve portion 28. The outer periphery of sleeve portion 28 defines an annular surface 29 upon which the sealing ring 12 is mounted in radially fixed but axially movable relation. A plurality of circumferentially spaced axially extending pockets or openings 32 are provided in the sleeve portion 28 as by drilling. Pockets 32 extend in underlying relation to surfaces 29 and have their openings in confronting relation to openings 25 in annular plate 21. The compression springs 16 are operatively interposed between follower ring 13 and follower 14, having their opposite ends received respectively in the pockets 32 and openings 25. Three circumferentially spaced axially extending openings or grooves 33 which conform to the cross section of lugs 22 are provided in the inner periphery of the sleeve 28 for receiving lugs 22 thereby interlocking follower ring 13 and follower 14. The follower ring 13 is axially slidable upon the lugs 22 but is nonrotatably secured thereto. The internal diameter of follower ring 13 is nearly as small as the internal diameter of retainer 14. The follower ring 13 need only be sufficiently larger in internal diameter to insure freedom of axial movement relative to shaft 7 to which retainer 14 may be press fitted. A plurality of circumferentially spaced bosses 34 extend from flange 27 in the same axial direction as the sleeve 28 of follower ring 13. Bosses 34 are adapted to be slidably received in corresponding axially extending openings 37 provided in the side of the sealing ring 12 which is opposite to the sealing surface 20. Bosses 34 thereby present a means for nonrotatably securing sealing ring 12 to follower ring 13.

The abutment ring 11 has an inwardly extending radial flange portion 38 and is provided with a plurality of circumferentially spaced axially extending openings 39 in the side opposite to the sealing surface 19. A plurality of pins 41 have their opposite ends anchored respectively in openings 39 and corresponding openings 42 provided in wheel hub 9 thereby securing the abutment ring 11 to wheel hub 9 for rotation therewith.

Boot 17 is made of suitable flexible material and has an axially extending sleeve portion 42 and radially inward extending flange portions 43 and 44. Flange portion 43 is in overlying relation to the back side of plate 21 and is provided with suitable openings through which bosses 24 project and in the installed condition is interposed between follower 14 and bracket 8. Flange portion 44 is interposed between radial flange 27 of follower ring 13 and the back side of sealing ring 12 and has suitable openings through which bosses 34 project. In the installed condition flanges 43 and 44 serve as a gasket to prevent escape of lubricant as well as entry of foreign matter while sleeve portion 42 seals the space between the follower 13 and follower ring 14. An O-ring 46 is retained in an annular groove 47 provided in abutment ring 11 which in the installed condition is operatively interposed between ring 11 and an axially extending annular flange 48 formed on hub 9.

In the assembled condition of the sealing unit 6 (best shown in FIG. 2) it will be seen that lugs 22 are radially spaced from and are disposed in axially underlapping relation to abutment and sealing ring 11 and 12. The follower ring 13 and springs 16 serve as an expansible pressure means 50 which are axially movable but radially and rotatably fixed on lugs 22. Annular plate 21 acts as a stop limiting axial movement of the pressure means in one direction. Springs 16 serve as axially resilient thrust transmitting elements being interposed between follower 14 and follower ring 13 and are compressed so as to urge follower ring 13 and sealing ring 12 in an axial direction toward abutment ring 11. Snap ring 18 being engageble with a shoulder presented by flange 38 of the abutment ring 11 serves as a stop means to limit axial movement of the abutment ring 11, and sealing surface 19 is thereby held in contact with sealing surface 20. Snap ring 18 being insertable into and withdrawable from grooves 23 thereby serves to releasably retain the sealing unit 16 as a package.

In the installed condition, as best shown in FIG. 1, lugs 22 of follower 14 define an axially extending portion which, along with the inner periphery of annular plate 21, is press fitted onto an enlarged portion of axle 7. The annular plate 21 is in thrust transmitting relation to bracket 8 being nonrotatably secured thereto by bosses 24. The expansible pressure means 50 are nonrotatably centered on lugs 22. Sealing ring 12 is in turn centered on the pressure means 50; is nonrotatably secured thereto by bosses 34; is axially movable therewith, being in thrust transmitting relation with flange 27; and is radially fixed thereon but axially movable with respect thereto in the direction away from flange 27 toward the abutment ring 11. The expansible pressure means 50 are operatively interposed between annular portion 21 of follower 14 and the sealing ring 12 thereby urging sealing surface 20 into sealing contact with sealing surface 19. Abutment ring 11 is in thrust transmitting relation to hub 9 being rotatably fixed thereto by pin 41 and being held in radial alignment thereon by flange 48. In the installed condition the spacing is such that springs 16 are compressed sufficiently so that the flange portion 38 of abutment ring 11 rotates free of snap ring 18. Follower 14, pressure means 50 and sealing ring 12 are effectively fixed to the stationary axle 7 and bracket 8 while the abutment ring 11 being fixed to the rotatable wheel hub 9 is the only component of the sealing unit 6 which rotates. In the type of installation which is illustrated, it is desirable for the sealing ring and abutment ring to be held in radial alignment concentric to the axis of rotation yet be relatively movable axially so as to maintain intimate contact between the sealing surfaces although some of the parts are slightly distorted tending to misalign the sealing surfaces. A flanged skirt 51 is attached to bracket 8 by bolts 52, forming a protective sleeve about the sealing unit 6 thereby shielding it from damage.

Sealing unit 6 is extremely simple to assemble and disassemble. For disassembly it is necessary only to remove the snap ring 18 and withdraw the several components, and assembly is accomplished by following these steps in reverse order. The feature of the thrust transmitting elements being located in openings which are radially disposed in underlying relation to the sealing ring is also shown in U.S. Patent No. 2,911,266, issued November 3, 1959 to W. R. Metzke. This feature permits a design having a minimum axial length. An additional advantage of this sealing unit is that the components have been designed so as to be extremely inexpensive to manufacture and can be produced from stampings, forgings or castings requiring very little machining.

Further, it will be apparent from the drawings and the foregoing detailed description that a novel construction and design for a cartridge type seal unit has been illustrated and described which will overcome the disadvantages inherent in the conventional devices.

It should be understood also that although the particular forms and details described herein illustrate only one embodiment of the invention; it is not intended to limit the patent granted herein otherwise than is necessitated by the scope of the appended claims.

What is claimed is:

1. A cartridge type axial contact sealing unit comprising: a pair of relatively rotatable and axially shiftable sealing members; a retainer element having a radially extending annular portion with an axially extending portion projecting therefrom, said axially extending portion being disposed in relatively overlapping relation with said sealing members; pressure means mounted on said axially extending portion in nonrotatable and axially shiftable relation to the latter, said annular portion being disposed in axial thrust transmitting relation with said pressure means for limiting movement of the latter in one axial direction, one of said sealing members being rotationally fixed on, centered by and in axial thrust transmitting relationship with said pressure means, being urged by the latter into sealing engagement with the other of said sealing members; and a releasable stop means secured to said axially extending portion and engageable in axial thrust transmitting relation with said other sealing member to limit movement of the latter in an axial direction opposite to said one axial direction.

2. A cartridge type axial contact sealing unit comprising: a pair of relatively rotatable and axially shiftable sealing members; a retainer element having a radially extending annular portion with an axially extending portion projecting therefrom, said axially extending portion disposed in axial underlapping relation to said sealing members; pressure means mounted on said axially extending portion in nonrotatable and axially shiftable relation to the latter, one of said sealing members being rotationally fixed on and centered by said pressure means, said pressure means including an axially resilient thrust transmitting element operatively interposed between said annular portion and said one sealing member and disposed radially between said axially extending portion and said one sealing member for urging the latter in one axial direction into sealing engagement with the other of said sealing members; and a releasable stop means on said axially extending portion in axial thrust transmitting relation with said other sealing member for limiting movement of the latter in an axial direction opposite to said one axial direction.

3. A cartridge type axial contact sealing unit comprising: an axially shiftable sealing ring; an abutment ring at one side of said sealing ring; a retainer element having a radially extending annular portion with a plurality of axially extending lugs projecting therefrom, said lugs being disposed in relatively overlapping relation to said abutment and sealing rings; pressure means rotatably fixed but axially slidable on said lugs in nonrotatable and axially shiftable relation to the latter, and in axial thrust transmitting relation with said annular portion, the latter being operative to limit movement of said pressure means in one axial direction, said sealing ring being rotationally fixed on, centered by, and in axial thrust transmitting relation with said pressure means, the latter being operative to urge said sealing ring into sealing contact with said abutment ring; and a releasable stop means secured to said lugs and engageable in axial thrust transmitting relation with said abutment ring to limit movement of the latter in an axial direction opposite to said one axial direction.

4. A cartridge type axial contact sealing unit as in claim 3 wherein said pressure means include an axially resilient thrust transmitting element operatively interposed between said annular portion and said sealing ring and disposed radially in axial overlapping relation to said sealing ring for urging the latter in one axial direction into sealing engagement with said abutment ring.

5. A cartridge type axial contact sealing unit as in claim 3 wherein said pressure means include an annular surface adjacent to a radially extending flange portion, and wherein said sealing ring is rotationally fixed on and centered by said annular surface and is disposed in axial thrust transmitting relation with said radial flange portion.

6. A cartridge type axial contact sealing unit comprising: an axially shiftable sealing ring; an abutment ring at one side of said sealing ring; a radially extending annular plate having a plurality of circumferentially spaced axially extending lugs projecting therefrom, said lugs being disposed in axial underlapping relation to said abutment and sealing rings; pressure means mounted on said lugs in nonrotatable and axially shiftable relation to the latter, said sealing ring being rotationally fixed on and centered by said pressure means, said pressure means including a plurality of axially resilient thrust transmitting elements reacting between said annular plate and said sealing ring and disposed radially in axial overlapping relation to said sealing ring for urging the latter in one axial direction away from said annular plate and into sealing engagement with said abutment ring; and releasable stop means secured to said lugs and engageable in axial thrust transmitting relation with said abutment ring for limiting movement of the latter in said one axial direction.

7. A cartridge type axial contact sealing unit comprising: an axially shiftable sealing ring; an abutment ring at one side of said sealing ring; a retainer including a radially extending annular plate having a plurality of circumferentially spaced axially extending lugs projecting therefrom, said lugs being disposed in axial underlapping relation to said abutment and sealing rings; a follower ring having a radially extending annular flange portion and an axially disposed sleeve portion projecting therefrom, said sleeve portion having an annular surface and having a plurality of radially disposed axially extending grooves for receiving said lugs, said sealing ring being centered on said annular surface in thrust transmitting relation with said flange portion, means for rotationally fixing said sealing ring on said follower ring; wall means in said follower ring defining a plurality of axially extending pockets radially disposed in underlying relationship to said sealing ring, each of said pockets having an opening in confronting relation to said annular plate; a plurality of coil springs received in said pockets and operatively interposed respectively between said annular plate and said follower ring for urging the latter in one axial direction; and releasable stop means secured to said lugs and engageable in axial thrust transmitting relationship with said abutment ring for preventing movement of the latter in said one axial direction.

8. The structure set forth in claim 7 wherein the internal diameter of said follower ring is nearly as small as the internal diameter of said retainer.

References Cited in the file of this patent
UNITED STATES PATENTS

| | | |
|---|---|---|
| 1,179,060 | Williamson | Apr. 11, 1916 |
| 2,287,207 | Vedovell | June 23, 1942 |
| 2,639,170 | Schick et al. | May 19, 1953 |
| 2,706,652 | Berger | Apr. 19, 1955 |
| 2,801,117 | Bourgeois et al. | July 30, 1957 |
| 2,871,040 | Payne | Jan. 27, 1959 |
| 2,884,267 | Kosatka | Apr. 28, 1959 |
| 2,911,266 | Metzke | Nov. 3, 1959 |

FOREIGN PATENTS

| | | |
|---|---|---|
| 513,642 | Canada | June 14, 1955 |

UNITED STATES PATENT OFFICE
CERTIFICATE OF CORRECTION

Patent No. 3,024,028                                    March 6, 1962

Bernard J. Murphy

It is hereby certified that error appears in the above numbered patent requiring correction and that the said Letters Patent should read as corrected below.

Column 4, lines 67 and 68, strike out "rotatable fixed but axially slidable" and insert instead -- mounted --.

Signed and sealed this 3rd day of July 1962.

(SEAL)
Attest:

ERNEST W. SWIDER                                DAVID L. LADD
Attesting Officer                                     Commissioner of Patents